(12) United States Patent
Bui Do et al.

(10) Patent No.: US 10,750,220 B2
(45) Date of Patent: Aug. 18, 2020

(54) METHOD FOR GENERATING A STL STREAM, LOCAL ADAPTER AND CORRESPONDING COMPUTER PROGRAM

(71) Applicant: ENENSYS TECHNOLOGIES, Cesson-Sevigne (FR)

(72) Inventors: Benoit Bui Do, Rennes (FR); Ludovic Poulain, Domloup (FR)

(73) Assignee: ENENSYS TECHNOLOGIES, Cesson-Sevigne (FR)

( * ) Notice: Subject to any disclaimer, the term of this patent is extended or adjusted under 35 U.S.C. 154(b) by 180 days.

(21) Appl. No.: 15/946,781

(22) Filed: Apr. 6, 2018

(65) Prior Publication Data

US 2019/0313137 A1     Oct. 10, 2019

(51) Int. Cl.
| | |
|---|---|
| *H04N 21/242* | (2011.01) |
| *H04L 29/06* | (2006.01) |
| *H04L 12/939* | (2013.01) |
| *H04H 20/10* | (2008.01) |
| *H04H 20/59* | (2008.01) |

(52) U.S. Cl.
CPC ........ *H04N 21/242* (2013.01); *H04H 20/103* (2013.01); *H04L 49/552* (2013.01); *H04L 65/102* (2013.01); *H04L 65/1069* (2013.01); *H04L 65/4076* (2013.01); *H04L 65/608* (2013.01); *H04H 20/59* (2013.01)

(58) Field of Classification Search
None
See application file for complete search history.

(56) References Cited

U.S. PATENT DOCUMENTS

| | | | |
|---|---|---|---|
| 9,148,607 B2 | 9/2015 | Lhermitte et al. | |
| 10,454,601 B2 | 10/2019 | Lhermitte | |
| 2016/0080828 A1* | 3/2016 | Roul | H04N 21/6143 725/67 |
| 2017/0201761 A1* | 7/2017 | Walker | H04N 19/46 |
| 2018/0145776 A1 | 5/2018 | Lhermitte | |
| 2019/0230419 A1* | 7/2019 | Yamagishi | H04H 20/59 |

FOREIGN PATENT DOCUMENTS

| | | |
|---|---|---|
| FR | 3036904 A1 | 12/2016 |
| WO | 2017217885 A1 | 12/2017 |

OTHER PUBLICATIONS

European Search Report dated Jun. 2019 for corresponding European Application No. 19164912.8.

* cited by examiner

*Primary Examiner* — Christopher Braniff
(74) *Attorney, Agent, or Firm* — David D. Brush; Westman, Champlin & Koehler, P.A.

(57) ABSTRACT

A method for generating an STL stream includes, in a local adapter serving a transmitter site in a broadcast network includes: receiving a first STL stream, generated by a broadcast gateway and having at least one frame including: a preamble packet, a timing packet, and at least one BB packet carrying at least one PLP; selecting at least one PLP carried by the BB packets, the BB packet(s) carrying the selected PLPs being called selected BB packet(s); generating an output STL stream including at least one frame having at least: a preamble packet, obtained from the preamble packet of the first STL stream, a timing packet, obtained from the timing packet of the first STL stream, and BB packets corresponding to the selected BB packets of the first STL stream. The frames of the first STL stream and the output STL stream have the same duration.

13 Claims, 5 Drawing Sheets

Fig. 8

METHOD FOR GENERATING A STL STREAM, LOCAL ADAPTER AND CORRESPONDING COMPUTER PROGRAM

1. FIELD OF THE DISCLOSURE

The present disclosure relates to the field of the broadcasting of information, especially the terrestrial broadcasting of television services.

More specifically, the present disclosure relates to the generation of a STL (Studio-to-Transmitter Link) stream in accordance with ATSC 3.0 standard, which is a broadcasting standard for terrestrial broadcasting, or future standards.

The generation of a STL stream according to the disclosure can be implemented in a local adapter, located upstream of an exciter of a transmitter site. Such local adapter can receive one or more STL streams (generated from one or more broadcast gateways), and generate a new STL stream from the received STL stream(s). The present disclosure thus offers a regionalization solution compliant at least with ATSC 3.0 standard.

2. PRIOR ART

2.1 Broadcast Network

Figure 1:
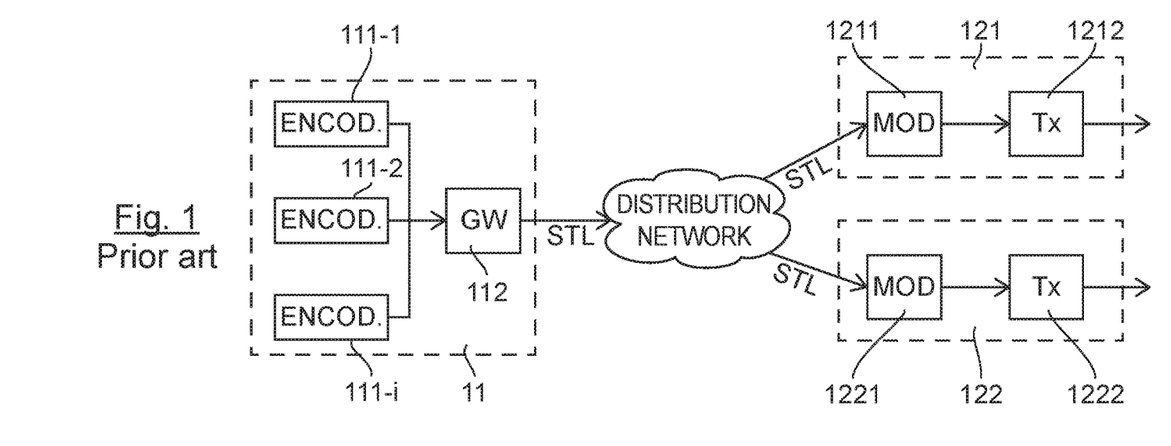
FIG. 1 illustrates a broadcast network according to ATSC 3.0 standard.

As illustrated in FIG. 1, a broadcast network according to ATSC 3.0 standard comprises at least:
- a head-end or studio 11: this is the main site of the ATSC 3.0 network. In this site, media contents from one or more sources are encoded (111-1, 111-2, 111-i) and adapted to be sent to at least one transmitter site 121, 122. The media content adaptation can be performed through one or more broadcast gateway(s) 112;
- one or several transmitter sites 121, 122: in these sites, the received data stream can be processed by at least a modulator 1211, 1221 (or exciter), to be emitted over the air by at least one antenna 1212, 1222, as a RF (radio-frequency) signal.

The RF signal generated by the transmitter sites 121, 122 can be received by an end user, for example on a TV set.

The data stream generated by the broadcast gateway(s) 112 is a STL stream. Such data stream can be sent from the studio 11 to the transmitter sites 121, 122 through a distribution network (for example through a satellite, IP network, micro-wave, radio frequency, etc., link).

2.2 Structure of a STL Stream

Figure 2:
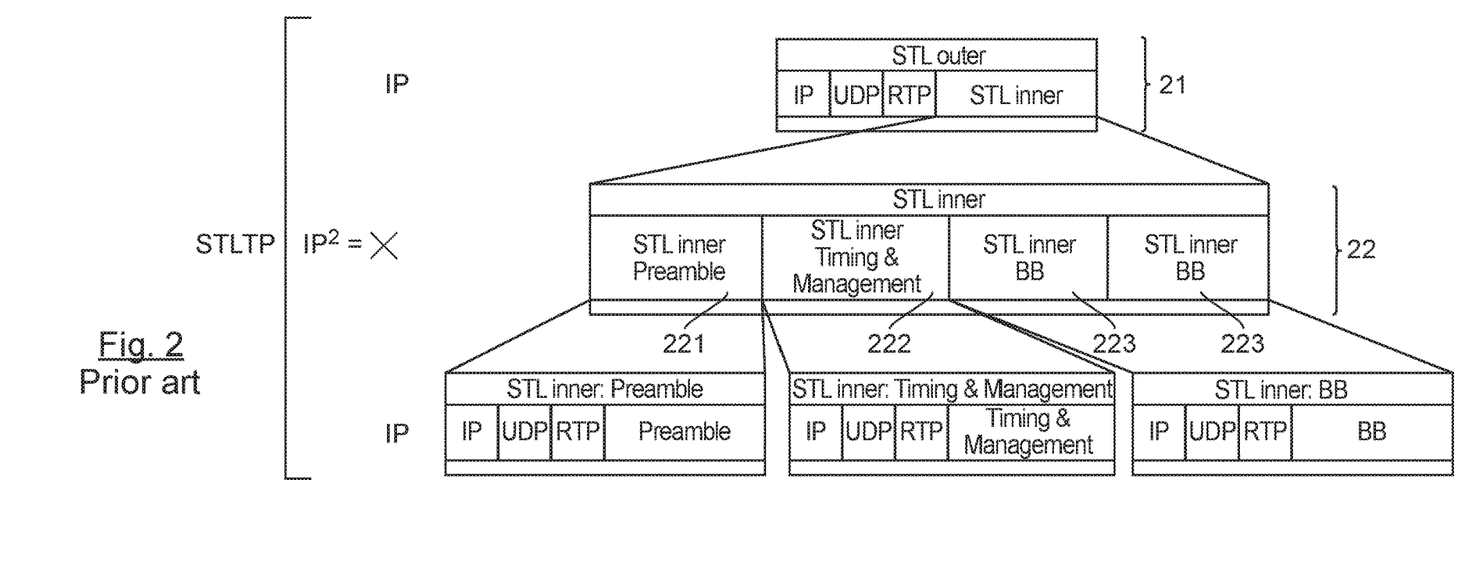
FIG. 2 presents the structure of a STL stream according to ATSC 3.0 standard.

The structure of a STL stream is described in view of FIG. 2. Such STL stream is formed by two IP layers: an outer layer 21, called "STL outer", and an inner layer 22, called "STL inner".

The STL outer 21 comprises a unique IP/UDP packet, i.e. addressed by a unique IP/UDP tuple. The payload of the STL outer is the STL inner. A specific RTP encapsulation can be added to allow transmission robustness (ECC, packet re-ordering) and the STL inner de-encapsulation.

The STL inner 22 comprises three types of packets:
- a STL inner preamble packet (PRE) 221, which comprises the physical layer signaling used for the exciter configuration,
- a STL inner timing and management packet (TMP) 222, or timing packet, which comprises the bootstrap signaling for the exciter configuration, and particularly a timestamp (or frame emission time) indicating the signal emission time at the transmitter site,
- at least one STL inner baseband packet (BBP) 223, which comprises the media content data to broadcast.

The STL stream can carry at least one PLP ("Physical Layer Pipe"). Each PLP is associated to a specific modulation configuration allowing a tunable degree of robustness for the data. Several BB packets can be used to carry one PLP. In this case, a BBP addressing per PLP can be defined.

Each of the STL inner packets (PRE, TMP and BBP packets) can be IP/UDP/RTP encapsulated. Each type of STL inner packet can be addressed by a unique IP/UDP tuple.

Figure 3:
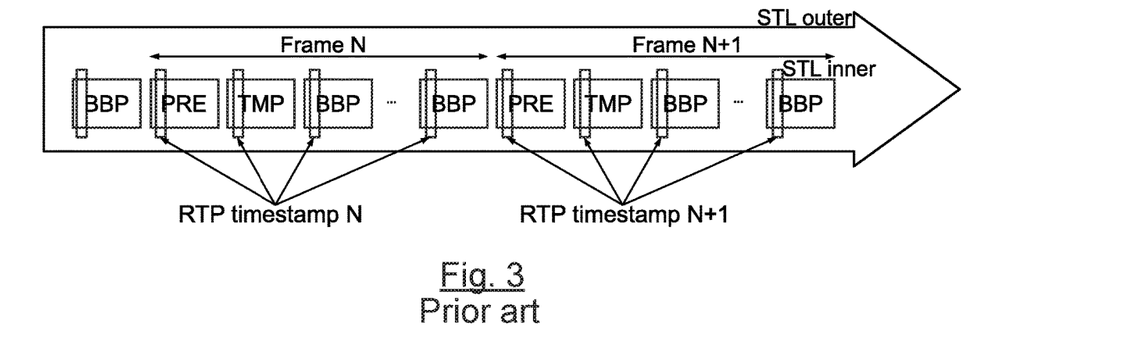
FIG. 3 illustrates the ATSC 3.0 frame notion at the STL stream level.

FIG. 3 illustrates the ATSC 3.0 frame notion at the STL stream level through the RTP timestamp of the STL layers. Indeed, all the STL inner packets of a given frame (frame N, frame N+1, . . . ) generally have the same RTP timestamp. Such RTP timestamp is usually a function of the emission time, at the transmitter site, of the given frame.

2.3 Regional Content Broadcasting

Regional content broadcasting consists in broadcasting per geographical area (states, region . . . ) specific contents dedicated to a given area, in addition or replacement to common contents shared by all the areas.

A first solution for regional content broadcasting consists in generating, in a central studio, several STL streams carrying each both common content and specific content, and to provide the STL streams to the different transmitter sites.

For example, a first STL stream carrying national common content and specific content dedicated to region A can be generated by a broadcast gateway in the central studio. Such first STL stream can then be distributed from the broadcast gateway to the exciters of the transmitter sites of region A. A second STL stream carrying national common content and specific content dedicated to region B can be generated by a broadcast gateway in the central studio. Such second STL stream can then be distributed from the broadcast gateway to the exciters of the transmitter sites of region B. A third STL stream carrying national common content and specific content dedicated to region C can be generated by a broadcast gateway in the central studio. Such third STL stream can then be distributed from the broadcast gateway to the exciters of the transmitter sites of region C.

If the first, second and/or third STL streams are generated by one or more broadcast gateways located in the same central studio, this solution relies on the reception, by the central studio, of the specific content dedicated to region A, the specific content dedicated to region B and the specific content dedicated to region C, in order to generate the different STL streams. In addition, this solution relies on the distribution of the different STL streams, each carrying the national common content, to the different regions. The national common content is thus duplicated in each STL stream, which is costly in terms of bandwidth.

If the first, second and/or third STL streams are generated by different broadcast gateways not located in the same central studio, the specific content dedicated to region A, B and/or C should be provided to the central studio, which is also costly.

In order to optimize the bandwidth cost of the distribution network, a solution based on PLP replacement is disclosed in U.S. Pat. No. 9,148,607. According to this patent, common contents are distributed only once in a main transport stream, and a recomposition device combines the content carried by the main transport stream with a content dedicated to a specific region served by the recomposition device. For example, the recomposition device replaces, in the main transport stream, a PLP comprising padding packets or packets carrying contents dedicated to a specific region (region B for example), with a PLP comprising some packets carrying contents dedicated to another specific region served by the recomposition device (region A for example).

Such solution imposes to add regional contents into the main transport stream to avoid sending PLPs constituted by padding BB packets, or to fill regional PLPs with padding BB packets. However, some broadcasters do not have the rights to broadcast regional content to areas non-concerned by the specific content. In this case, regional PLPs must be filled with padding BB packets, which is costly in term of bandwidth.

There is thus a need for a new regional content broadcasting solution compliant at least with ATSC 3.0 standard.

3. SUMMARY OF THE DISCLOSURE

The disclosure proposes a novel solution for regional content broadcasting that is compliant with ATSC3.0 standard or future standards.

A first embodiment of the disclosure relies on a method for generating a STL stream, comprising, in at least one local adapter configured to serve at least one transmitter site in a broadcast network:
 receiving a first STL stream, generated by a first broadcast gateway, comprising at least one frame comprising:
  a preamble packet,
  a timing packet, and
  at least one BB packet carrying at least one PLP,
 selecting at least one PLP among the PLPs carried by the BB packets of the first STL stream, the BB packet(s) carrying the selected PLPs being called selected BB packet(s),
 generating an output STL stream, said output STL stream comprising at least one frame comprising at least:
  a preamble packet, obtained from the preamble packet of the first STL stream,
  a timing packet, obtained from the timing packet of the first STL stream, and
  BB packets corresponding to the selected BB packets of the first STL stream, the frames of the first STL stream and of the output STL stream having the same duration.

According to the first embodiment, the local adapter receives one STL stream from a broadcast gateway, and output one STL stream. The output STL stream thus carries less PLPs than the input STL stream, as it carries only the selected PLPs.

A second embodiment of the disclosure relies on a method for generating a STL stream, comprising, in at least one local adapter configured to serve at least one transmitter site in a broadcast network:
 receiving a first STL stream, generated by a first broadcast gateway,
 receiving at least one second STL stream, generated by at least one second broadcast gateway,
 each of said first stream and said second STL stream(s) comprising at least one frame comprising:
  a preamble packet,
  a timing packet, and
  at least one BB packet carrying at least one PLP,
 synchronizing said first STL stream and said second STL stream(s), using at least one frame emission time of each of said first STL stream and said second STL stream(s),
 selecting at least one PLP among the PLPs carried by the BB packets of the first STL stream and the PLP carried by the BB packets of said second STL stream(s), the BB packet(s) carrying the selected PLPs being called selected BB packet(s),
 generating an output STL stream, said output STL stream comprising at least one frame comprising at least:
  a preamble packet, obtained from the preamble packet of at least one of said first STL stream and said second STL stream(s),
  a timing packet, obtained from the timing packet of at least one of said first STL stream and said second STL stream(s), and
  BB packets corresponding to the selected BB packets of at least one of the first STL stream and the second STL stream(s),
 the frames of the first STL stream, of the second STL stream(s) and of the output STL stream having the same duration.

According to the second embodiment, the local adapter receives at least two STL streams from one or more broadcast gateways, and output one STL stream. The number of PLPs carried by the output STL stream depends on the number of PLPs selected in the input STL streams. The structure, in terms of numbers of BB packets, of the output STL stream can thus differ from the structure of the input STL streams.

At least one embodiment of the disclosure also aims at protecting a computer program comprising instructions adapted to implementing the method for generating a STL stream as described here above when this program is executed by a processor, as well as a computer-readable information medium comprising instructions of a computer program as mentioned here above.

At least one embodiment of the disclosure also relates to a device for generating a STL stream as described above, called a local adapter.

Such device could of course comprise the different characteristics pertaining to the method for generating a STL stream according to the disclosure. Such characteristics can be combined or taken in isolation.

In particular, one local adapter can be located in one region/cell cluster (several transmitter sites belonging to a same region) or else at each transmitter site. Each transmitter site can broadcast an ATSC 3.0 RF stream generated from the STL stream outputted by a local adapter.

4. LIST OF FIGURES

Other features and advantages of the disclosure shall appear more clearly from the following description of a particular embodiment given by way of a simple illustratory and non-exhaustive example and from the appended figure of which.

5. DESCRIPTION OF ONE EMBODIMENT OF THE DISCLOSURE

The general principle relies on the distribution, in a broadcast network according to ATSC 3.0 standard for example, of at least one STL stream carrying one or more PLPs, and the generation, by a local adapter receiving the distributed STL stream(s), of a new STL stream to be transmitted to the transmitter sites.

A local adapter according to the disclosure can thus receive either only one STL stream, or several STL streams, select the desired PLPs in the received STL streams, and generate a new STL stream from the PLP selection, with updated preamble (PRE) and timing (TMP) packets depending on the PLP selection. At least one embodiment of the disclosure thus relies on PLP aggregation, instead of PLP replacement as disclosed in the prior art.

In particular, PLP aggregation can be performed deterministically to ensure a SFN broadcasting of the ATSC 3.0 RF streams outputted by each transmitter site.

The management of regional content can thus be achieved using the Multiple Physical Layer Pipes (PLP) technology. For example, common contents can be carried in one or several PLPs in a first STL stream. Regional contents can be carried in one or more PLPs in at least one second STL stream. The first STL stream thus carries common contents, for example a national content, and doesn't carry a specific content, for example dedicated to a specific region, or padding packets in one or more PLPs, as disclosed in U.S. Pat. No. 9,148,607.

According to at least one embodiment, the local adapter is a device of the transmitter site, connected to or integrated to the exciter of the transmitter site. Each transmitter site can thus be equipped with a local adapter.

According to another embodiment, the local adapter can be located upstream of the transmitter sites. In this case, one local adapter can serve one or more transmitter sites. For example there is one local adapter per SFN region/cell cluster.

Figure 4:
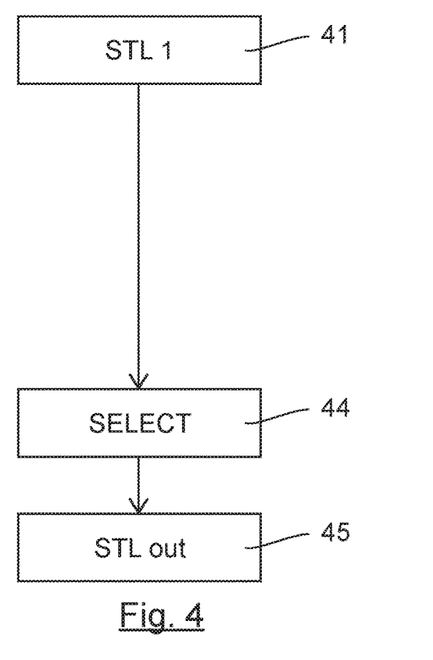
FIGS. 4 and 5 are block diagrams representing the method for generating a STL stream according to two embodiments.
Figure 5:
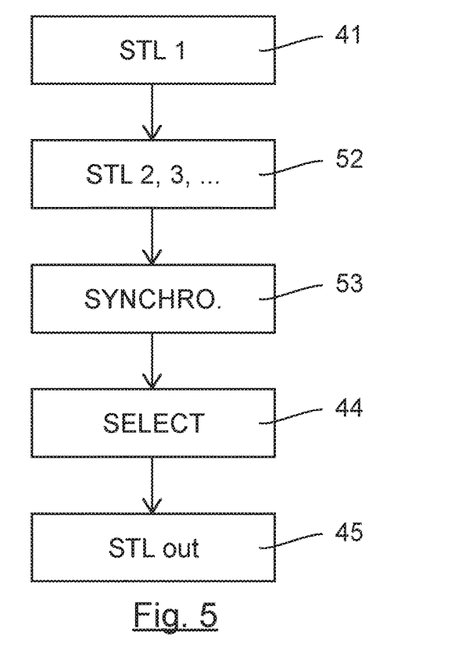

FIGS. 4 and 5 illustrate a method for generating a STL stream according to two embodiments, implemented in at least one local adapter configured to serve at least one transmitter site in a broadcast network.

According to a first embodiment, illustrated in FIG. 4, the local adapter receives (41) a first STL stream, STL1, generated by a first broadcast gateway. Such STL stream (or more specifically at least one inner layer of the STL stream) comprises at least one frame comprising:
a preamble packet,
a timing packet, and
at least one BB packet carrying at least one PLP.

The local adapter selects 44 at least one PLP among the PLPs carried by the BB packets of STL1. In other words, the local adapter selects all the BB packets of at least one PLP among the BB packets of STL1. For example, if STL1 carries three PLPs, one PLP carrying national content (PLP0), one PLP carrying regional content dedicated to region B (PLP1), and one PLP dedicated to region C (PLP2), a local adapter serving the transmitter sites of region B can select only PLP0 and PLP1.

The local adapter then generates (45) an output STL stream, STL out. Such STL stream (or more specifically at least one inner layer of the STL stream) comprises at least one frame comprising at least:

a preamble packet, obtained from the preamble packet of STL1,
a timing packet, obtained from the timing packet of STL1, and
BB packets corresponding to the selected BB packets of STL1,
the frames of STL1 and of STL out having the same duration.

According to the first embodiment, where only one STL stream is inputted to the local adapter, the timing packet of the output STL stream, STL out, corresponds to the timing packet of the first STL stream, STL1. For example, the timing packet of STL out can be obtained by duplicating the timing packet of STL1.

According to at least one embodiment, generating the output STL stream also comprises updating the dynamic fields of the timing packet dedicated to emergency alert. To do so, the method also comprises:
detecting emergency alert information in the selected PLPs,
updating at least one emergency alert field of the timing packet of the output STL stream based on the detected emergency alert information.

In particular, detecting emergency alert information comprises detecting, for each selected PLP, if an Advanced Emergency Alerting Table is present. For example, the emergency alert field of the timing packet of the output STL stream comprises a flag whose value depends on a sum of the version value of the detected Advanced Emergency Alerting Tables.

According to the first embodiment, the preamble packet of the output STL stream, STL out, can be initialized with PLP information of the preamble packet of the first STL stream, STL1, said PLP information being related to the selected PLP(s). For example, the parts of the preamble packet of STL1 corresponding to the selected PLP(s) can be copied in the preamble packet of STL out.

According to at least one embodiment, generating the output STL stream also comprises updating the dynamic fields of the preamble packet. To do so, the method also comprises:
detecting low layer signaling information in the selected PLPs,
updating at least one low layer signaling field of the preamble packet of the output STL stream based on the detected low layer signaling information.

In particular, the low layer signaling field of the preamble packet of the output STL stream comprises a flag whose value is set to a predetermined value when a Low Layer Signaling Table is detected in at least one of the selected PLPs.

Such method can be used to generate the preamble packet, timing packet and BB packets of at least one frame of the output stream. Such packets can be duplicated and updated for generating other frames of the output stream.

At least one inner layer of the output STL stream can be generated in this way. The output layer of the output STL stream can then be classically generated, by rebuilding at least the marker and offset fields.

According to a second embodiment, illustrated in FIG. 5, the local adapter receives (41) a first STL stream, STL1, as in the first embodiment. In addition, the local adapter receives (52), simultaneously or at a different time, at least one second STL stream, STL2, STL3, . . . , generated by at least one second broadcast gateway. Such STL stream (or more specifically at least one inner layer of the STL stream) comprises at least one frame comprising:

a preamble packet,
a timing packet, and
at least one BB packet carrying at least one PLP.

According to the second embodiment, the received STL streams (STL1, STL2, . . . ) have the same frame duration. This constraint allows the synchronization of the received STL streams and then a deterministic processing.

The first STL stream, STL1, and second STL stream(s), STL2, STL3, . . . , are then synchronized (53) using at least one frame emission time of the first STL stream and one frame emission time of the second STL stream(s).

For example, the method comprises selecting one reference stream among the first STL stream and the second STL stream(s), and synchronizing the first STL stream and second STL stream(s) comprises aligning the frame emission time of all the input STL streams on the frame emission time of the reference stream.

As per the first embodiment, the local adapter then selects (44) at least one PLP carried by the received streams. However, in the second embodiment, the local adapter selects at least one PLP among the PLP carried by the BB packets of the first STL stream, STL1, and the PLP carried by the BB packets of the second STL stream(s), STL2, STL3, . . . .

Then, as per the first embodiment, the local adapter generates (45) the output STL stream. However, in the second embodiment:
the preamble packet of the output STL stream is obtained from the preamble packet of the first STL stream and/or the second STL stream(s),
the timing packet of the output STL stream is obtained from the timing packet of the first STL stream and/or the second STL stream(s), and
the BB packets of the output STL stream correspond to the selected BB packets of the first STL stream and/or the second STL stream(s),
the frames of the first STL stream, of the second STL stream(s) and of the output STL stream having the same duration.

According to the second embodiment, where at least two STL streams are inputted to the local adapter, the timing packet of the output STL stream, STL out, is initialized with the timing packet of the reference stream. For example, if STL1 is chosen as a reference stream, the timing packet TMP of STL1 can be copied in the timing packet TMP of STL out.

According to at least one embodiment, generating the output STL stream also comprises updating the dynamic fields of the timing packet dedicated to emergency alert. To do so, the method also comprises, as per the first embodiment:
detecting emergency alert (EA) information in the selected PLPs,
updating at least one emergency alert field of the timing packet of the output STL stream based on the detected emergency alert information.

In particular, detecting emergency alert information comprises detecting, for each selected PLP, if an Advanced Emergency Alerting Table is present. For example, the emergency alert field of the timing packet of the output STL stream comprises a flag whose value depends on a sum of the version value of the detected Advanced Emergency Alerting Tables.

In other words, the emergency alert flag has to be generated into the output STL stream depending on the PLP selection. For example, all the emergency alerts from the selected PLPs should be generated in the STL output, whereas an alert of a non-selected PLP should be removed. According to the embodiment disclosed above, when an EA trigger is detected on the STL input streams, the local adapter checks the AEAT table presence on each selected PLP. In the case where no AEAT table has been found, the EA flag on the STL output can be set to '0', meaning that there is no emergency alert. At the opposite, when at least one AEAT table is detected, an EA flag value different from 0 can be generated. This value can be computed as follows: for each AEAT table detected, the AEAT table version value is extracted, and all the version values are summed. The result of this sum is translated to the alert interval [1 . . . 3] thanks to a modulo 3 operation followed by an addition of 1. The process according to this embodiment enables a deterministic generation of the EA flag on the output STL.

According to the second embodiment, the preamble packet of the output STL stream, STL out, can be initialized with PLP information of the preamble packet of the first STL stream, STL1, or of the second STL stream(s), STL2, STL3, . . . said PLP information being related to the selected PLP(s). For example, parts of the preamble packet of STL1 corresponding to selected PLP(s) and/or parts of the preamble packet of STL2 (and/or STL3, etc.) corresponding to selected PLP(s) can be copied in the preamble packet of STL out. The relative parts of each selected PLPs, in the preamble packets of the input STL streams, can be copied in the preamble packet of the STL output stream.

According to at least one embodiment, generating the output STL stream also comprises updating the dynamic fields of the preamble packet. To do so, the method also comprises:
detecting low layer signaling information in the selected PLPs,
updating at least one low layer signaling field of the preamble packet of the output STL stream based on the detected low layer signaling information. In particular, the low layer signaling field of the preamble packet of the output STL stream comprises a flag whose value is set to a predetermined value when a Low Layer Signaling Table is detected in at least one of the selected PLPs.

In other words, the dynamic fields of the preamble packet are related to LLS flags. These LLS flags are associated to LLS tables carried by the input PLPs. As for the timing packet, LLS tables are present or not in the STL output stream depending on the selected PLPs. When at least one LLS table is present in the STL output, the LLS flag can be set to '1' (for example based on an "OR" processing on the selected PLPs).

Such method can be used to generate the preamble packet, timing packet and BB packets of at least one frame of the output stream. Such packets can be duplicated and updated for generating other frames of the output stream.

At least one inner layer of the output STL stream can be generated with the preamble packet PRE, timing packet TMP and BB packets carrying the selected PLPs aligned on the reference stream. For example, the RTP timestamps of the BB packets of the output STL stream can be-aligned on the RTP timestamp of the BB packets of the reference stream.

The output layer of the output STL stream can then be generated, by rebuilding at least the marker and offset fields.

The STL output stream can then be transmitted to an exciter of a transmitter site.

Figure 6:
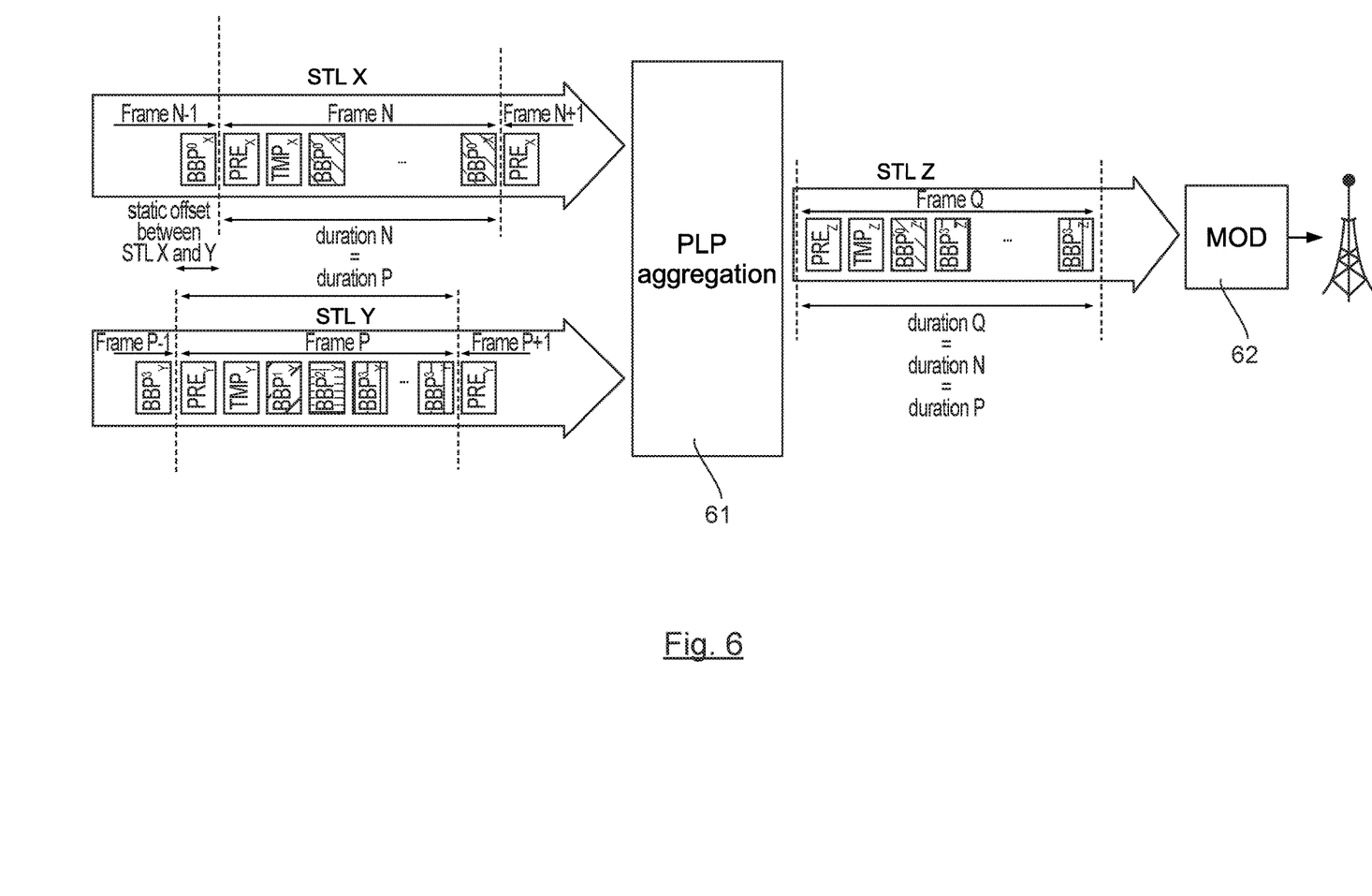
FIG. 6 gives an example of input and output STL streams according to the disclosure.

We now describe, in view of FIG. 6, an example of STL streams inputted to and outputted from a local adapter 61, and transmitted to an exciter 62.

For example, the local adapter 61 receives two input STL streams, STL X and STL Y, both having a same frame duration. The output STL stream, STL Z, also has the same frame duration.

STL X and STL Y can be synchronized, based on the frame emission time of a frame of STL X (for example frame N) and the frame emission time of a frame of STL Y (for example frame P). Such frame emission time can be encoded in a timestamp in each frame, for example a RTP timestamp or a bootstrap emission time timestamp of the timing packet. The frame emission time of frame N of STL X is not mandatorily the same as the frame emission time of frame P of STL Y, but they are synchronous due to the frame duration constraint and the time synchronization of the broadcast gateways with the TAI time (International Atomic Time). The potential offsets between the frames emission time are then static.

In order to synchronize the input streams, one input stream is selected as a reference stream, and the frame emission time of all the input STL streams are aligned on the frame emission time of the reference stream. For example, STL X is selected as the reference stream, and the frame emission time of the output stream STL Z (for example its RTP timestamp) is set equal to the frame emission time of STL X. This allows a deterministic construction of the STL output timestamp.

At least one PLP can then be selected among the input STLs. All the BB packets related to a selected PLP can be copied as BB packets of the output STL.

For example, the input stream STL X carries in frame P only one PLP on the BB packets BBP° (PLP0). The input stream STL Y carries three different PLPs in frame P: a first PLP on the BB packets BBP$^1$ (PLP1), a second PLP on the BB packets BBP$^2$ (PLP2) and a third PLP on the BB packets BBP$^3$ (PLP3).

If two PLPs are selected, for example PLP0 carried by STL X and PLP3 carried by STL Y, all the BB packets of frame N of STL X carrying PLP0 and all the BB packets of frame P of STL Y carrying PLP3 can be copied as BB packets of frame Q of the output stream STL Z.

The preamble packet and timing packet of the output stream STL Z can be generated from the preamble packet and timing packet of the input streams STL X and STL Y, as disclosed above in view of FIG. 5.

Figure 7:
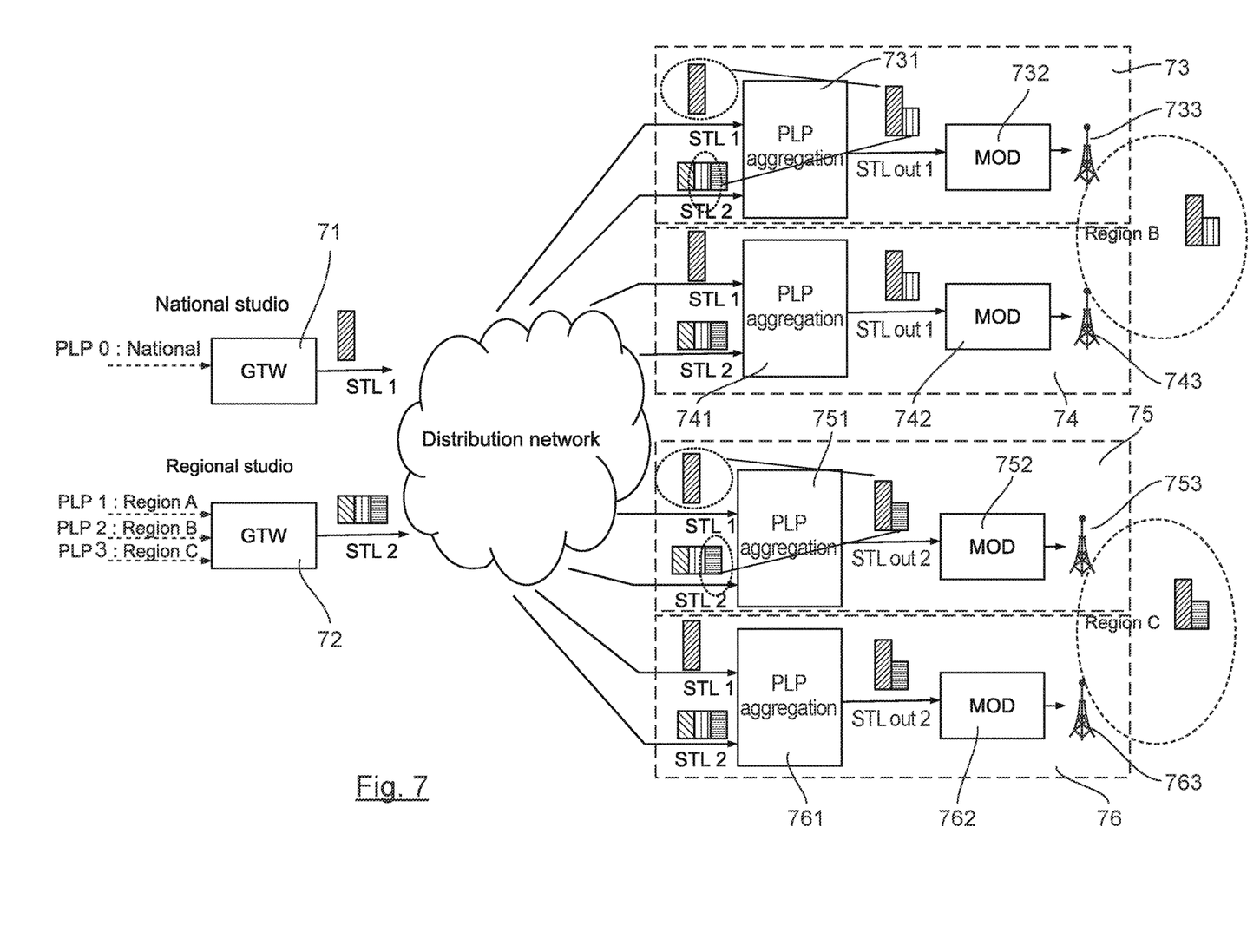
FIGS. 7 and 8 present examples of regional content broadcasting according to the disclosure.
Figure 8:
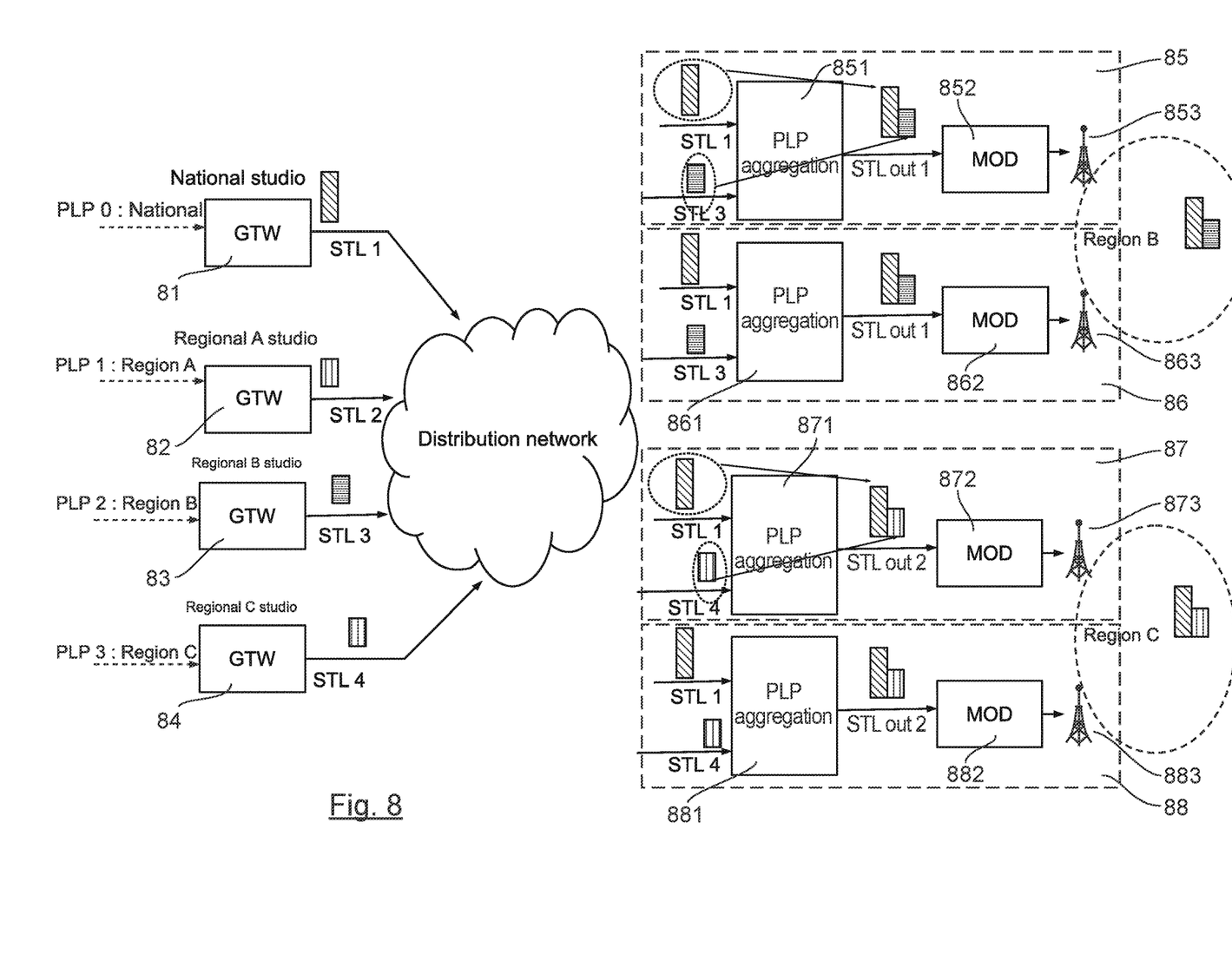

FIGS. 7 and 8 illustrate two examples of broadcasting networks implementing a regional content broadcasting according to the disclosure.

According to a first example illustrated in FIG. 7, the broadcasting network comprises a first studio comprising a first broadcast gateway 71 outputting a first STL stream, STL1. For example, the first broadcast gateway 71 is located in a national studio, and outputs a STL stream STL1 carrying only one PLP, PLP0, comprising national content.

The broadcasting network also comprises a second studio comprising a second broadcast gateway 72 outputting a second STL stream, STL2. For example, the second broadcast gateway 72 is located in a regional studio, and outputs a STL stream STL2 carrying three PLPs comprising specific regional contents: a first PLP carrying regional content dedicated to region A, PLP1, a second PLP carrying regional content dedicated to region B, PLP2, and a third PLP carrying regional content dedicated to region C, PLP3.

STL1 and STL2 are distributed in a distribution network (for example through a satellite, IP network, micro-wave, and/or radio frequency link), from the first broadcast gateway 71 and the second broadcast gateway 72, to the transmitter sites 73 and 74 of region B, and to the transmitter sites 75 and 76 of region C.

Each transmitter site (73, 74, 75, 76) according to this example comprises a local adapter (731, 741, 751, 761) according to at least one embodiment of the disclosure, an exciter (732, 742, 752, 762) and an antenna (733, 743, 753, 763).

Each local adapter (731, 741, 751, 761) receives both STL1 and STL2.

Each of the local adapters 731 and 741 located on the transmitter sites 73 and 74 of region B can select the PLPs carrying national content and regional content dedicated to region B, i.e. PLP0 carried by STL1 and PLP2 carried by STL2, in order to generate a first STL output stream, STLout1, according to at least one embodiment of the disclosure. STLout1 carries PLP0 and PLP2, but doesn't carry PLP1 and PLP3, which are dedicated to other regions. STLout1 issued by local adapter 731 can be transmitted to the exciter 732, and sent as a RF signal through the antenna 733. STLout1 issued by local adapter 741 can be transmitted to the exciter 742, and sent as a RF signal through the antenna 743.

Each of the local adapters 751 and 761 located on the transmitter sites 75 and 76 of region C can select the PLPs carrying national content and regional content dedicated to region C, i.e. PLP0 carried by STL1 and PLP3 carried by STL2, in order to generate a second STL output stream, STLout2, according to at least one embodiment of the disclosure. STLout2 carries PLP0 and PLP3, but doesn't carry PLP1 and PLP2, which are dedicated to other regions. STLout2 issued by local adapter 751 can be transmitted to the exciter 752, and sent as a RF signal through the antenna 753. STLout2 issued by local adapter 761 can be transmitted to the exciter 762, and sent as a RF signal through the antenna 763.

According to a second example illustrated in FIG. 8, the broadcasting network comprises a first studio comprising a first broadcast gateway 81 outputting a first STL stream, STL1. For example, the first broadcast gateway 81 is located in a national studio, and outputs a STL stream STL1 carrying only one PLP, PLP0, comprising national content.

The broadcasting network also comprises a second studio comprising a second broadcast gateway 82 outputting a second STL stream, STL2, a third studio comprising a third broadcast gateway 83 outputting a third STL stream, STL3, and a fourth studio comprising a fourth broadcast gateway 84 outputting a fourth STL stream, STL4. For example, the second broadcast gateway 82 is located in a regional studio dedicated to region A, and STL2 carries only one PLP, comprising regional content dedicated to region A (PLP1), the third broadcast gateway 83 is located in a regional studio dedicated to region B, and STL3 carries only one PLP comprising regional content dedicated to region B (PLP2), and the fourth broadcast gateway 84 is located in a regional studio dedicated to region C, and STL4 carries only one PLP comprising regional content dedicated to region C (PLP3).

STL1, STL2, STL3 and STL4 are distributed in a distribution network from the fourth broadcast gateways 81, 82, 83, 84, to the transmitter sites 85 and 86 of region B, and to the transmitter sites 87 and 88 of region C.

Each transmitter site (85, 86, 87, 88) according to this example comprises a local adapter (851, 861, 871, 881) according to at least one embodiment of the disclosure, an exciter (852, 862, 872, 882) and an antenna (853, 863, 873, 883).

Each local adapter (851, 861, 871, 881) receives all the STL streams STL1, STL2, STL3 and STL4. In variant, the local adapters receive the STL stream carrying national content and the STL stream carrying regional content dedicated to the region served by the local adapter.

Each of the local adapters 851 and 861 located on the transmitter sites 85 and 86 of region B can select the PLPs carrying national content and regional content dedicated to region B, i.e. PLP0 carried by STL1 and PLP2 carried by STL3, in order to generate a first STL output stream, STLout1, according to at least one embodiment of the disclosure. STLout1 carries PLP0 and PLP2, but doesn't carry PLP1 and PLP3, which are dedicated to other regions. STLout1 issued by local adapter 851 can be transmitted to the exciter 852, and sent as a RF signal through the antenna 853. STLout1 issued by local adapter 861 can be transmitted to the exciter 862, and sent as a RF signal through the antenna 863.

Each of the local adapters 871 and 881 located on the transmitter sites 87 and 88 of region C can select the PLPs carrying national content and regional content dedicated to region C, i.e. PLP0 carried by STL1 and PLP3 carried by STL4, in order to generate a second STL output stream, STLout2, according to at least one embodiment of the disclosure. STLout2 carries PLP0 and PLP3, but doesn't carry PLP1 and PLP2, which are dedicated to other regions. STLout2 issued by local adapter 871 can be transmitted to the exciter 872, and sent as a RF signal through the antenna 873. STLout2 issued by local adapter 881 can be transmitted to the exciter 882, and sent as a RF signal through the antenna 883.

At least one embodiment of the disclosure thus offers a solution for regional content broadcasting solution compliant at least with ATSC 3.0 standard.

Figure 9:
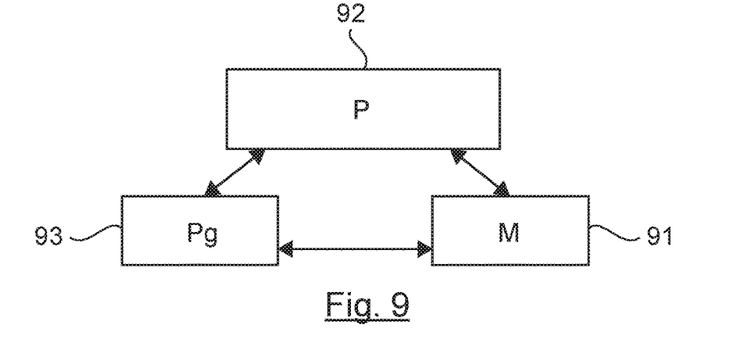
FIG. 9 illustrates the simplified structure of a local adapter according to a particular embodiment of the disclosure.

Referring finally to FIG. 9, we present the simplified structure of local adapter for generating a STL stream implementing the method for generating a STL stream according to at least one embodiment described here above.

Such a device comprises a memory 91, for example a buffer memory, a processing unit 92 equipped for example with a processor P and driven by the computer program 93 implementing the method for generating a STL stream according to at least one embodiment.

At initialization, the code instructions of the computer program 93 are for example loaded into a RAM and then executed by the processor of the processing unit 92. The processing unit 92 inputs at least one STL stream. The processor of the processing unit 92 implements the method described here above, according to the instructions of the computer program 93, to generate a new STL stream carrying only the selected PLPs and with updated signaling information.

According to this embodiment, the processing unit 92 is configured to:
receive a first STL stream, generated by a first broadcast gateway, comprising at least one frame comprising:
  a preamble packet,
  a timing packet and
  at least one BB packet carrying at least one PLP,
select at least one PLP among the PLPs carried by the BB packets of said first STL stream, the BB packet(s) carrying the selected PLPs being called selected BB packet(s),
generate an output STL stream, said output STL stream comprising at least one frame comprising at least:
  a preamble packet, obtained from the preamble packet of the first STL stream,
  a timing packet, obtained from the timing packet of the first STL stream, and
  BB packets corresponding to the selected BB packets of the first STL stream, the frames of the first STL stream and of the output STL stream having the same duration.

Although the present disclosure has been described with reference to one or more examples, workers skilled in the art will recognize that changes may be made in form and detail without departing from the scope of the disclosure and/or the appended claims.

The invention claimed is:

1. A method for generating a Studio-to-Transmitter Link (STL) stream, comprising the following acts performed by at least one local adapter configured to serve at least one transmitter site in a broadcast network:
  receiving a first STL stream from a first broadcast gateway, comprising at least one frame comprising:
    a preamble packet,
    a timing packet, and
    at least one baseband (BB) packet carrying at least one physical layer pipe (PLP),
  receiving at least one second STL stream from at least one second broadcast gateway, said second STL stream(s) comprising at least one frame comprising:
    a preamble packet,
    a timing packet, and
    at least one BB packet carrying at least one PLP,
  synchronizing said first STL stream and said second STL stream(s), using at least one frame emission time of each of said first STL stream and said second STL stream(s),
  selecting at least one PLP among the PLPs carried by the BB packets of the first STL stream and the PLPs carried by the BB packets of the second STL stream(s), the BB packet(s) carrying the selected PLPs being called selected BB packet(s),
  generating an output STL stream, said output STL stream comprising at least one frame comprising at least:
    a preamble packet, obtained from the preamble packet of at least one of the first stream and the second STL stream(s),
    a timing packet, obtained from the timing packet of at least one of the first STL stream and the second STL stream(s), and
    BB packets corresponding to the selected BB packets of at least one of the first STL stream and the second STL stream(s),
  the frames of the first STL stream, of the second STL stream(s) and of the output STL stream having a same duration.

2. The method according to claim 1, comprising selecting one reference stream among said first STL stream and said second STL stream(s).

3. The method according to claim 2, wherein synchronizing said first STL stream and said second STL stream(s) comprises:
  aligning the frame emission time of said first STL stream and of said second STL stream(s) on the frame emission time of the reference stream.

4. The method according to claim 2, wherein generating the output STL stream comprises:
  initializing the timing packet of the output STL stream with the timing packet of the reference stream.

5. The method according to claim 1, wherein generating the output STL stream also comprises:

detecting emergency alert information in the selected PLPs, updating at least one emergency alert field of the timing packet of the output STL stream based on the detected emergency alert information.

6. The method according to claim 5, wherein detecting emergency alert information comprises detecting, for each selected PLP, if an Advanced Emergency Alerting Table is present, and wherein the emergency alert field of the timing packet of the output STL stream comprises a flag whose value depends on a sum of the version value of the detected Advanced Emergency Alerting Tables.

7. The method according to claim 1, wherein generating the output STL stream comprises:

initializing the preamble packet of the output STL stream with PLP information of the preamble packet of the first STL stream or of the second STL stream(s), said PLP information being related to the selected PLPs.

8. The method according to claim 1, wherein generating the output STL stream comprises:

detecting low layer signaling information in the selected PLPs, updating at least one low layer signaling field of the preamble packet of the output STL stream based on the detected low layer signaling information.

9. The method according to claim 8, wherein the low layer signaling field of the preamble packet of the output STL stream comprises a flag whose value is set to a predetermined value when a Low Layer Signaling Table is detected in at least one of the selected PLPs.

10. The method according to claim 2, wherein generating the output STL stream also comprises:

aligning the RTP timestamps of the BB packets of the output STL stream on the RTP timestamp of the BB packets of the reference stream.

11. The method according to claim 1, comprising transmitting the STL output stream to a modulator of said transmitter site.

12. A local adapter for generating a STL stream, configured to serve at least one transmitter site in a broadcast network, comprising:

at least one processor; and
a non-transitory computer-readable medium comprising instructions stored thereon, which when executed by the at least one processor configure the local adapter to perform acts comprising:
receiving a first STL stream from a first broadcast gateway, comprising at least one frame comprising:
a preamble packet,
a timing packet and
at least one baseband (BB) packet carrying at least one physical layer pipe (PLP),
receiving at least one second STL stream from at least one second broadcast gateway, said second STL stream(s) comprising at least one frame comprising:
a preamble packet,
a timing packet, and
at least one BB packet carrying at least one PLP,
synchronizing said first STL stream and said second STL stream(s), using at least one frame emission time of each of said first STL stream and said second STL stream(s), selecting at least one PLP among the PLPs carried by the BB packets of said first STL stream and the PLPs carried by the BB packets of the second STL stream(s), the BB packet(s) carrying the selected PLPs being called selected BB packet(s),
generating an output STL stream, said output STL stream comprising at least one frame comprising at least:
a preamble packet, obtained from the preamble packet of at least one of the first STL stream and the second STL stream(s),
a timing packet, obtained from the timing packet of at least one of the first STL stream and the second STL stream(s), and
BB packets corresponding to the selected BB packets of at least one of the first STL stream and the second STL stream(s),
the frames of the first STL stream, of the second STL stream(s) and of the output STL stream having a same duration.

13. A non-transitory computer-readable medium comprising a computer program stored thereon comprising instructions for implementing a method for generating a Studio-to-Transmitter Link (STL) stream when this program is executed by a processor of a local adapter configured to serve at least one transmitter site in a broadcast network, wherein generating the STL stream comprises the following acts performed by the local adapter:

receiving a first STL stream from a first broadcast gateway, comprising at least one frame comprising:
a preamble packet,
a timing packet, and
at least one baseband (BB) packet carrying at least one physical layer pipe (PLP),
receiving at least one second STL stream from at least one second broadcast gateway, said second STL stream(s) comprising at least one frame comprising:
a preamble packet,
a timing packet, and
at least one BB packet carrying at least one PLP,
synchronizing said first STL stream and said second STL stream(s), using at least one frame emission time of each of said first STL stream and said second STL stream(s),
selecting at least one PLP among the PLPs carried by the BB packets of the first STL stream and the PLPs carried by the BB packets of the second STL stream(s), the BB packet(s) carrying the selected PLPs being called selected BB packet(s),
generating an output STL stream, said output STL stream comprising at least one frame comprising at least:
a preamble packet, obtained from the preamble packet of at least one of the first STL stream and the second STL stream(s),
a timing packet, obtained from the timing packet of at least one of the first STL stream and the second STL stream(s), and
BB packets corresponding to the selected BB packets of at least one of the first STL stream and the second STL stream(s),
the frames of the first STL stream, of the second STL stream(s) and of the output STL stream having a same duration.

* * * * *

UNITED STATES PATENT AND TRADEMARK OFFICE
CERTIFICATE OF CORRECTION

Page 1 of 1

PATENT NO. : 10,750,220 B2
APPLICATION NO. : 15/946781
DATED : August 18, 2020
INVENTOR(S) : Benoit Bui Do et al.

It is certified that error appears in the above-identified patent and that said Letters Patent is hereby corrected as shown below:

In the Claims

Claim 1, Column 12, Line 42:
Insert the word --STL-- between the words "first" and "stream."

Signed and Sealed this
Eleventh Day of January, 2022

Drew Hirshfeld
*Performing the Functions and Duties of the*
*Under Secretary of Commerce for Intellectual Property and*
*Director of the United States Patent and Trademark Office*